(12) United States Patent
Ma

(10) Patent No.: US 8,806,001 B2
(45) Date of Patent: Aug. 12, 2014

(54) METHOD, DEVICE AND GATEWAY SERVER FOR DETECTING PROXY AT THE GATEWAY

(75) Inventor: Cheng Ma, Guangdong (CN)

(73) Assignee: Sangfor Technologies Company Limited, Nanshan District, Shenzhen, Guangdong (CN)

( * ) Notice: Subject to any disclaimer, the term of this patent is extended or adjusted under 35 U.S.C. 154(b) by 262 days.

(21) Appl. No.: 13/005,348

(22) Filed: Jan. 12, 2011

(65) Prior Publication Data

US 2011/0173318 A1 Jul. 14, 2011

(30) Foreign Application Priority Data

Jan. 14, 2010 (CN) .......................... 2010 1 0044415

(51) Int. Cl.
*G06F 15/173* (2006.01)
*G06F 15/16* (2006.01)

(52) U.S. Cl.
USPC .......................................... 709/224; 726/12

(58) Field of Classification Search
CPC ....................................................... H04L 9/32
USPC .......... 709/224, 225, 227, 230; 726/3, 12, 14, 726/25; 713/168, 185
See application file for complete search history.

(56) References Cited

U.S. PATENT DOCUMENTS

| | | | |
|---|---|---|---|
| 6,510,464 B1 * | 1/2003 | Grantges et al. | 709/225 |
| 7,761,558 B1 * | 7/2010 | Jindal et al. | 709/224 |
| 7,962,603 B1 * | 6/2011 | Morimoto | 709/224 |
| 8,095,654 B2 * | 1/2012 | Morimoto | 709/224 |
| 8,266,687 B2 * | 9/2012 | Baldry | 726/12 |
| 2006/0190990 A1 * | 8/2006 | Gruper et al. | 726/3 |
| 2012/0079104 A1 * | 3/2012 | Casado et al. | 709/224 |

* cited by examiner

*Primary Examiner* — Lynn Feild
*Assistant Examiner* — Timothy Sowa
(74) *Attorney, Agent, or Firm* — Global IP Services; Tianhua Gu

(57) ABSTRACT

The present invention provides a method for detecting proxy at the gateway, comprising decomposing the access request from the IP need to be proxy-monitored into an access request to original address and an access request to gateway-specified address to access the original address and the gateway-specified separately; determining whether a specific cookie information is included in said access request to gateway-specified address or not to obtain a second determining result; responding to the access request to said gateway-specified address and embedding the cookie information with the time stamp into the client PC by the gateway when said second determining result is no, and reading said cookie information when said second determining result is yes; determining whether said IP is using proxy or not on the basis of said cookie information. Accordingly, the present invention also provides a device and gateway server for detecting proxy at the gateway. It can be detected accurately and secretly in the intranet whether a certain IP is using common proxy or nat proxy.

9 Claims, 3 Drawing Sheets

METHOD, DEVICE AND GATEWAY SERVER FOR DETECTING PROXY AT THE GATEWAY

CROSS REFERENCE TO RELATED PATENT APPLICATION

The present application claims the priority of Chinese patent application No. 201010044415.0 filed on Jan. 14, 2010.

FIELD OF THE INVENTION

The present invention relates to the field of computer communication and security, especially to a method, device and gateway server for detecting proxy at the gateway.

BACKGROUND OF THE INVENTION

The internet has been utilized in various aspects of the daily living and work with the popularization of the information technology, especially the network technology. Many problems arise due to the improper network behaviors by the employees, such as lower working efficiency, leakage of the company's confidential information and so on. Consequently, the controllable network has been intended to build up in every company, enterprise, government agency or other entities.

However, the proxy connecting technology in the intranet becomes an obstacle to the building-up of the controllable network as mentioned above. By means of proxy technology, the terminal PC without access right can be accessible to the internet, and the monitoring device is unable to distinguish the invalid PC. Therefore, it's necessary to identify whether there is proxy connection in the intranet at the gateway for achieving the network control.

There are many methods for detecting common proxy and nat proxy in the prior art, such as track detection, clock offset, application feature detection, web page redirection with cookie counting and so on. But all of the methods named above have shortages.

Firstly, the track detection method relies on the sections with changes in the 16 bits identification of the IP address header during the TCP connection. If a certain source IP address address has 3 identification sections changing continuously after a period of time, it means that at least 3 users are now occupying the bandwidth simultaneously through the IP address. This method is effective in detecting nat proxy, but invalid in detecting common proxy.

Secondly, the different physical clock offsets of different hosts is utilised in the clock offset method. Because of the correspondence between the clock in the network protocol stack and physical stock, a statistically corresponding relationship is between the message sending frequencies of the different hosts and the clock. The different hosts can be identified by finding different network clock offsets with the use of certain spectrum analysis algorithm. It is not effective either in detecting the common proxy owing to similarly using the IP address header information for detection.

Thirdly, the application feature detection method detects by analyzing the User-agent field of the HTTP header in the data messages, the said User-agent field of the HTTP header being different according to the versions of OS, IE and patches. It is hard to detect in most of the companies with the software uniquely installed and thus the method is not reliable.

Finally, the key technologies of the web page redirection with cookie counting are the web page redirection, embedding cookie and cookie counting. This method can achieve the proxy detection in the intranet (including the common proxy detection and nat proxy detection), while the web page redirection is a bit inferior and can be realized significantly by the terminal PC users. The URL of the website to be visited in the browser address bar is directed to the gateway's URL, and redirected to such website. The considerable directing time is tested to be 1 to 2 seconds. Besides, it is not scientific and practical for simply counting the cookie and PC. For example, it will lead to inaccurate cookie counting with the one IP address if the PC clients clear all the cookies. In addition, the cookie counting is hard to be accurate in the case of the environments with randomly assigned or frequently changed IP address addresses, and the misjudging of terminals will be caused.

SUMMARY OF THE INVENTION

In view of the existing problems in the prior art as mentioned above, the embodiments according to the present provide a method, device and gateway server for detecting proxy at the gateway. By the use of garnished response, cookie embedding and corresponding proxy determining, provided herein is a practical, highly secret and accurate proposal for detecting the common and nat proxy in the intranet.

For achieving technical effects as mentioned above, a method for detecting proxy at the gateway is provided in the embodiments according to the present invention, comprising:

determining whether the access request from a certain IP address need to be proxy-monitored or not to obtain a first determining result;

decomposing said access request into an access request to original address and an access request to gateway-specified address to access the original address and the gateway-specified address separately when the first determining result is yes;

determining whether a specific cookie information is included in said access request to gateway-specified address or not to obtain a second determining result, said specific cookie information being the cookie information with the time stamp embedded into the client PC by the gateway when responding to said access request to gateway-specified address;

responding to the access request to gateway-specified address and embedding the cookie information with the time stamp into the client PC by the gateway when said second determining result is no;

reading said cookie information when said second determining result is yes;

determining whether said IP address is using proxy or not on the basis of said cookie information.

Accordingly, a device for detecting proxy at the gateway is also provided in the embodiments according to the present invention, comprising:

a first determining module, for determining whether the access request from a certain IP address need to be proxy-monitored or not to obtain a first determining result;

an access request decomposing module, connected with said first determining module and for decomposing said access request into an access request to original address and an access request to gateway-specified address to access the original address and the gateway-specified address separately when the first determining result is yes;

a second determining module, connected with said access request decomposing module and for determining whether a specific cookie information is included in said access request to gateway-specified address or not to obtain a second determining result, said specific cookie information being the cookie information with the time stamp embedded into the client PC by the gateway when responding to said access request to gateway-specified address;

a cookie embedding module, connected with said second determining module and for responding to the access request to gateway-specified address and embedding the cookie information with the time stamp into the client PC by the gateway when said second determining result is no;

a cookie reading module, connected with said second determining module and for reading said cookie information when said second determining result is yes;

a third determining module, connected with said second determining module and said cookie reading module separately, and for determining whether said IP address is using proxy or not on the basis of said cookie information.

Accordingly, a gateway server including the above-mentioned device for detecting proxy at the gateway is further provided in the embodiments according to the present invention.

Implementing the embodiments according to the present invention, firstly determining whether the access request from a certain IP address need to be proxy-monitored or not to obtain a first determining result. Then decomposing said access request into an access request to original address and an access request to gateway-specified address to access the original address and the gateway-specified address separately when the first determining result is yes. Then determining whether a specific cookie information is included in said access request to gateway-specified address or not to obtain a second determining result, said specific cookie information being the cookie information with the time stamp embedded into the client PC by the gateway when responding to said access request to gateway-specified address. Then responding to the access request to gateway-specified address and embedding the cookie information with the time stamp into the client PC by the gateway when said second determining result is no, or reading said cookie information when said second determining result is yes. Finally, determining whether said IP address is using proxy or not on the basis of said cookie information. It can be detected accurately and secretly in the intranet whether a certain IP address is using common proxy or nat proxy.

BRIEF DESCRIPTION OF THE DRAWINGS

The accompanying drawings to be used in the description of the embodiments or the prior art will be briefly described here, in order to explain clearly the technical solutions in the embodiments according to the present invention or in the prior art. It is obvious that the drawings described hereafter are only some embodiments according to the present invention, and other drawings can be acquired in view of these drawings by the ordinary skilled in the art without paying creative work.

DETAILED DESCRIPTION OF THE PREFERRED EMBODIMENT

A method, device and gateway server for detecting proxy at the gateway is provided in the embodiments according to the present invention. By use of garnished response, cookie embedding and corresponding proxy determining, provided herein is a practical, highly secret and accurate proposal for detecting the common and nat proxy in the intranet.

The embodiments according to the present invention will now be illustrated in detail with reference to the accompanying drawings.

Figure 1:
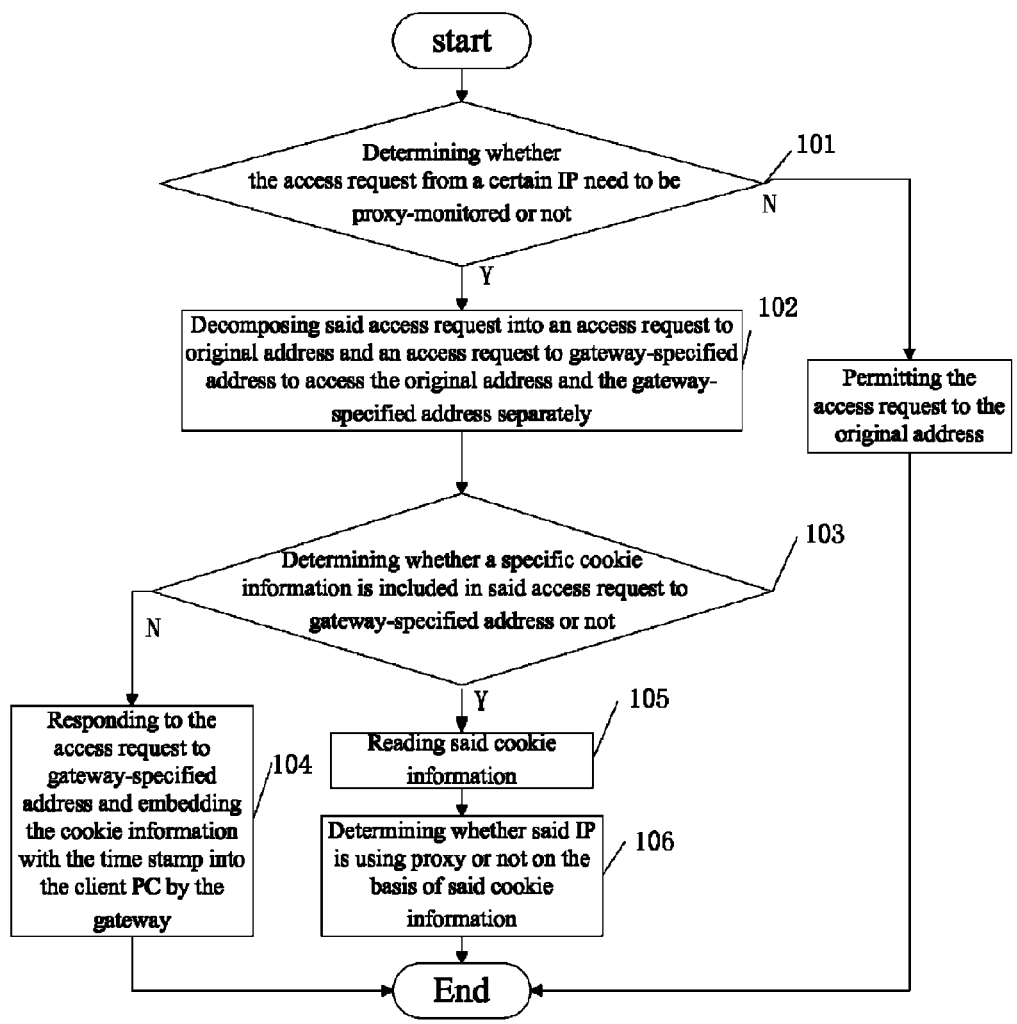
FIG. 1 is the flow chart of the method for detecting proxy at the gateway in an embodiment according to the present invention.

Referring to FIG. 1, it is shown the flow chart of the method for detecting proxy at the gateway in an embodiment according to the present invention. The method includes the following steps:

Step 101: It is determined whether the access request from a certain IP address need to be proxy-monitored or not to obtain a first determining result. When the first determining result is yes, the method moves to step 102. When the first determining result is no, namely the access request from a certain IP address need not to be proxy-monitored, the access to the original address is permitted. Prior to step 101, it is further included setting all the IP address that need to be proxy-monitored in the intranet according to the network rules of the enterprise. For example, the IP address occupied by the president's office need not be monitored while the ones occupied by the development department need to be monitored. Therefore, the IP address occupied by the president's office and the development department are set to be or not to be monitored separately. Consequently, in the proxy-monitoring, the IP address occupied by the president's office are directly permitted to access the internet, whereas the ones occupied by the development department are proxy-monitored through the following steps when accessing the internet.

Step 102: When the first determining result in step 101 is yes, the access request is decomposed into an access request to original address and an access request to gateway-specified address to access the original address and the gateway-specified address separately. This step is a garnished response, namely, when one IP address in the proxy-monitored IP address requests to access the internet through the gateway, the access request ('get' request) is decomposed by the gateway into two access requests, of which one is the access request to original address and the other is the access request to gateway-specified address to access the original address and the gateway-specified address separately, in order to enable the synchronous or asynchronous access to the original address and the gateway-specified address. The opportunities for cookie embedding and analyzing are obtained without being realized by the terminal users.

Step 103: It is determined whether a specific cookie information is included in the access request to gateway-specified address to obtain a second determining result, the specific cookie information being the cookie information with the time stamp embedded into the client PC by the gateway when responding to the access request to gateway-specified address. When the second determining result is yes, the method moves to step 105, otherwise it moves to step 104 when the second determining result is no. The specific cookie information is the cookie information with the time stamp embedded into the client PC without the cookie information of accessing the gateway-specified address when the gateway is giving the garnished response. The detailed embedding process is described in step 104.

Step 104: When the second determining result is no, the gateway responds to the access request to gateway-specified address and embeds the cookie information into the client PC. The embedded cookie information is the cookie information with the time stamp. By the use of the principle of the cookies accessing the same website by the different hosts being different, namely one cookie being able to identify one PC, the cookie information with the time stamp is embedded into the PC receiving the garnished response in the embodiment according to the present invention, in order to prepare for subsequent determining whether the IP address is using proxy by using the cookie information embedded in this step. The time stamp in the cookie information with the time stamp is determined by the current time of the gateway system when being embedded. For instance, host A accessed the gateway-specified address at 14:58:26, Dec. 28, 2009, and no cookie information of accessing the gateway-specified address is present therein, the cookie with time stamp is embedded into host A in the embodiment according to the present invention. The format of the embedded cookie information can be sinfor_cookie_time=20091228145826. It is noted that the cookie information can be any other format and is not restricted to the one exemplified as above.

Step 105: When the second determining result is yes, the cookie information is read, namely, when the second determining result obtained in step 103 is yes, it reveals that the PC accessing the gateway-specified address has ever been embedded cookie information in the embodiment according to the present invention, and the cookie information contained in the access request is now read.

Step 106: It is determined whether the IP address is using proxy on the basis of the cookie information, which is the key step in the present invention. There are two methods for determining whether the IP address is using proxy on the basis of the cookie information in the embodiment according to the present invention as described below respectively.

The first determining method is preferably described, which includes the steps:

A1: A list is pre-established to cache the cookie information and cookie count of each IP address. When implementing, the pre-established list can be a hash table or a link list, in which the cookie information (such as sinfor_cookie_time above) and cookie count are cached for every IP address that need to be proxy-monitored.

B1: When the second determining result is no, namely if there is no cookie information detected when checking the 'get' request packages going to the gateway-specified address, all the cookie information of the corresponding IP address cached in the list is cleared and the cookie count is assigned to 0. This step is provided to avoid misjudging, for example, one PC is correlated to one cookie when surfing the internet, and another cookie will be embedded once again into the PC when it sends the access request again after clearing the cookie in the PC, the PC thus will be correlated to two cookie when the gateway counts, which leads to the misjudgement. However, in this step, all the cookie information of the corresponding IP address cached in the list will be cleared and the cookie count will be assigned to 0 as long as no cookie information is embedded into the host with the IP address accessing the gateway-specified address. The miscounting can be effectively avoided and thus the misjudgement can be avoided.

C1: When the second determining result is yes, namely if there is cookie information detected when checking the 'get' request packages going to the gateway-specified address, the cookie information is read, and it is determined whether the read cookie information is already in the list or not. When the cookie information isn't in the cache, it is inserted into the corresponding cookie information list of corresponding IP address, and the cookie count is added by 1. It can be viewed as the counting step.

D1: It is determined the corresponding cookie count of said certain IP address is more than or equal to 2 or not, and obtaining the judgement that said IP address is using proxy if being yes. It is determined in this step whether the IP address is using proxy according to the cookie count, which is counted in step C1. Only when the corresponding cookie count of the IP address is bigger than or equal to 2, can it be determined that the IP address is using proxy. After a predetermined period of time, it can also be determined through the cookie count how many computers are accessing internet with this IP address. For example, in a period of time, it is determined that there are 3 hosts using the same IP address, namely 2 of them are accessing the internet using this IP address through proxy, if the corresponding cookie count of one IP address has always been 3, or the maximum value thereof is 3.

The first determining method is described above. The method can not only determine whether a certain IP address is using proxy or not, but also determine how many computers are accessing the internet with the one IP address after predetermined time accumulation. The second determining method is described as follows, which can also determine whether a certain IP address is using proxy and avoid the misjudgement, while it can not determine how many computers are accessing the internet through one IP address.

This method includes the following steps:

A2: A list is pre-established to cache the cookie information of each IP address, the cookie information being the cookie information with the time stamp. The time stamp in the cookie information is determined by the current time of the gateway system when being embedded. When implementing, the pre-established list can be a hash table or a link list, in which the cookie information is cached for every IP address that needs to be proxy-monitored.

B2: When the second determining result is yes, the cookie information is read, and the cookie information in which is compared with the time stamp in the corresponding cookie information of the IP address cached before in the list.

C2: When the time stamp in the read cookie information is later than the time stamp in the corresponding cookie information of the IP address cached before in the list, the corresponding cookie information of the IP address cached before in the list is replaced by the read cookie information. In other words, only is the latest cookie information of each IP address cached in the list. When one PC is accessing the gateway-specified address through a certain IP address, the IP address is using proxy if the cookie information carried in the 'get' request is earlier than the corresponding cookie information of the IP address cached in the list.

D2: When the time stamp in the read cookie information is earlier than the time stamp in the corresponding cookie information of the IP address cached before in the list, the judgement is obtained that the IP address is using proxy.

The method for detecting proxy at the gateway in the embodiments according to the present invention is described in detail. The device for detecting proxy at the gateway in the embodiments according to the present invention is now described with reference to FIG. 2, FIG. 3 and FIG. 4.

Figure 2:
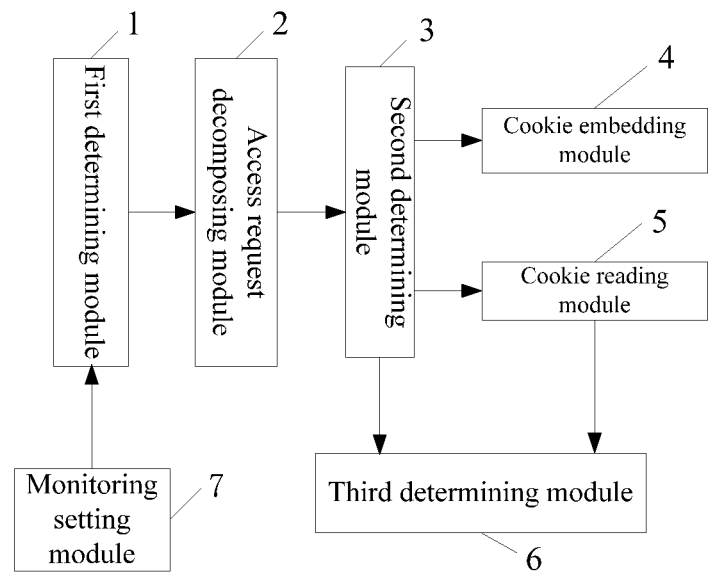
FIG. 2 is the schematic structural view of the device for detecting proxy at the gateway in an embodiment according to the present invention.

Referring to FIG. 2, it is shown the first schematic structural view of the device for detecting proxy at the gateway in the embodiment according to the present invention, which includes: a first determining module 1, an access request decomposing module 2, a second determining module 3, a cookie embedding module 4, a cookie reading module 5 and a third determining module 6.

The first determining module 1 is used for determining whether the access request from a certain IP address need to be proxy-monitored or not to obtain a first determining result. It is determined according to the network rules of the enterprise, namely all the IP addresses that need to be proxy-monitored will be pre-set. For example, the IP address occupied by the president's office need not be monitored while the ones occupied by the development department need to be monitored. Therefore, the IP address occupied by the president's office and the development department are set to be or not to be monitored respectively. Consequently, in the proxy-monitoring, the IP address occupied by the president's office are permitted to access the internet directly, whereas the ones occupied by the development department will be proxy-monitored accordingly.

The access request decomposing module 2 is connected with the first determining module 1, and used for decomposing the access request into the access request to original address and the access request to gateway-specified address to access the original address and the gateway-specified address separately, in order to enable the synchronous or asynchronous access to the original address and the gateway-specified address and obtain the opportunities for cookie embedding and analyzing without being realized by the terminal users when the first determining result is yes.

The second determining module 3 is connected with the access request decomposing module 2, and used for determining whether a specific cookie information is included in the access request to gateway-specified address or not to obtain a second determining result.

The cookie embedding module 4 is connected with the second determining module 3, and used for responding to the access request to gateway-specified address and embedding the cookie information with the time stamp into the client PC by the gateway when the second determining result is no. By the use of the principle of the cookies accessing the same website by the different hosts being different, namely one cookie being able to identify one PC, the cookie information with the time stamp is embedded into the PC receiving the garnished response in the embodiment according to the present invention, in order to prepare for subsequent determining whether the IP address is using proxy by using the cookie information embedded in this step.

The cookie reading module 5 is connected with the second determining module 3, and used for reading the cookie information when the second determining result is yes, namely reading the cookie information carried in the access request as the cookie information in the embodiment according to the present invention has been embedded into the PC accessing the gateway-specified address.

Figure 3:
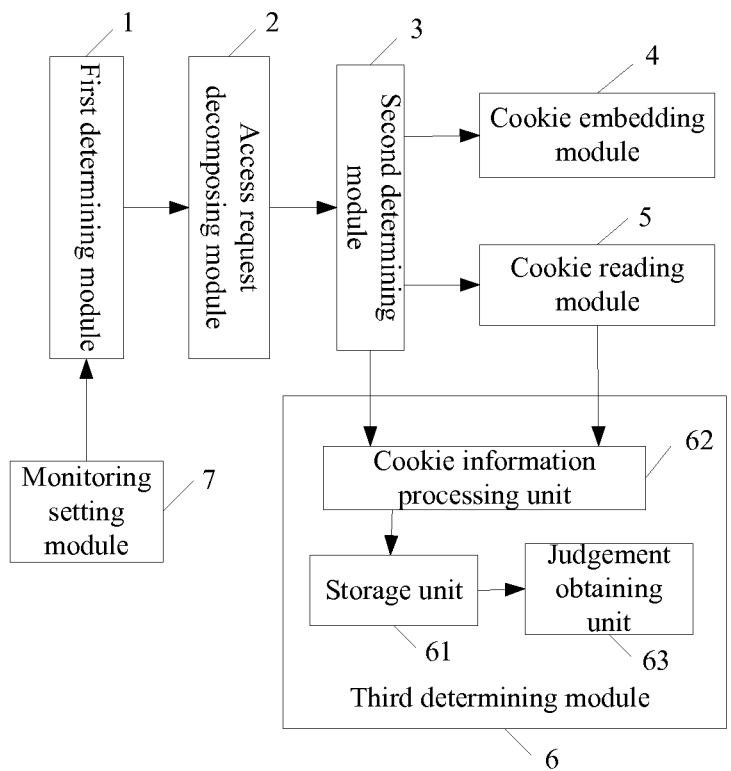
FIG. 3 is a first detailed structural view of the device for detecting proxy at the gateway in FIG. 2.
Figure 4:
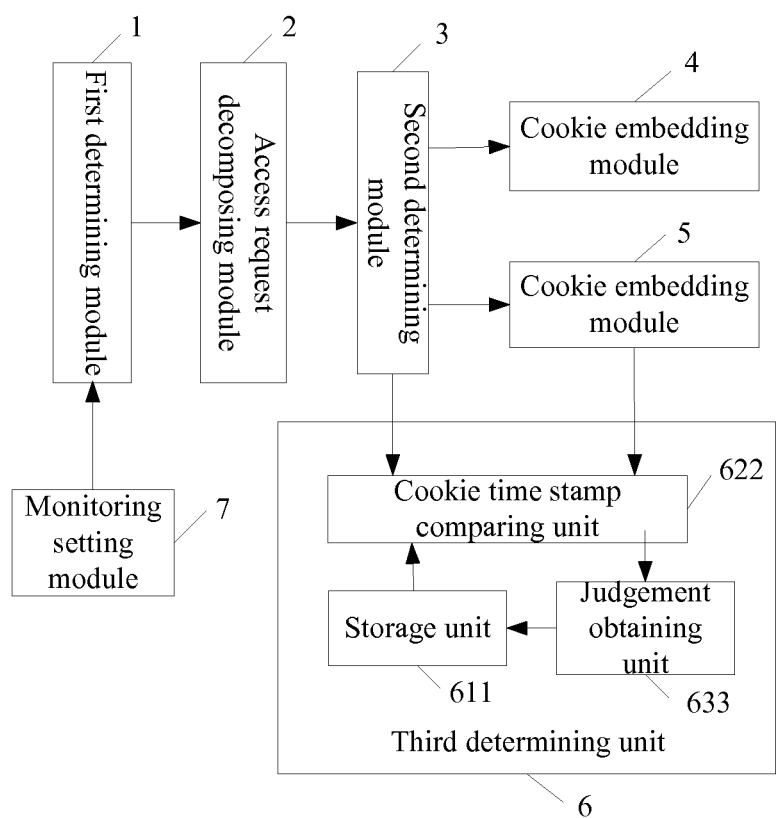
FIG. 4 is a second detailed structural view of the device for detecting proxy at the gateway in FIG. 2.

The third determining module 6 is connected with the second determining module 3 and cookie reading module 5 respectively, and used for determining whether the IP address is using proxy or not on the basis of the cookie information. In the above description of the method, there are two ways to determine whether the IP address is using proxy or not on the basis of the cookie information in the final step according to the present invention. Accordingly, there are two different structures for the third determining module 6, as shown in FIG. 3 and FIG. 4.

The device for detecting proxy at the gateway further includes monitoring setting module 7, which is connected with the first determining module 1 and used for the pre-setting all the IP address that need to be proxy-monitored.

The first structure of the third determining module 6 is described below with reference to FIG. 3. Referring to FIG. 3, it is shown the first detailed structural view of the device for detecting proxy at the gateway in FIG. 2. The structure depicted in FIG. 3 is the same as FIG. 2, except that a detailed first interior structure of the third determining module 6 is shown. The first structure of the third determining module includes:

A storage unit 61 is used for caching the cookie information and cookie count of each IP address. A pre-established list can be stored in the storage unit 61. The list can be a hash table or link list. The cookie information (such as sin-for_cookie_time above) and cookie count are cached for every IP address that needs to be proxy-monitored in the established hash table or link list.

A cookie information processing unit 62 is connected with the storage unit 61, the second determining module 3 and the cookie reading module 5 separately, and used for clearing all the cookie information of the corresponding IP address cached in the storage unit 61 and assigning 0 to the cookie count when the second determining result is no, and for inserting the read cookie information into the corresponding cookie information list of corresponding IP address and adding the cookie count by 1 when the second determining result is yes and the cookie information read by the cookie reading module doesn't exist in the cache. It is to avoid the misjudgement clearing all the cookie information of the corresponding IP address cached in the storage unit 61 and assigning 0 to the cookie count when the second determining result is no. For example, one PC is correlated to one cookie when surfing the internet, and another cookie will be embedded once again into the PC when it gives the access request again after clearing the cookie in the PC, the PC thus will be correlated to two cookie when the gateway counts, which leads to the misjudgement. However, in this step, all the cookie information of the corresponding IP address cached in the list will be cleared and the cookie count will be assigned to 0 as long as no cookie information is embedded into the host with the IP address accessing the gateway-specified address. The miscounting can be effectively avoided and thus the misjudgement can be avoided. A judgement obtaining unit 63 is connected with the storage unit 61, and used for determining whether the corresponding cookie count of said certain IP address is more than or equal to 2 or not, and obtaining the judgement that said IP address is using proxy if being yes.

Furthermore, after a predetermined period of time, it can also be determined through the cookie count how many computers are accessing internet with this IP address. For example, in a period of time, it can be determined that there are 3 hosts using the same IP address, namely 2 of them are accessing the internet with this IP address through proxy, if the corresponding cookie count of one IP address has always been 3, or the maximum value thereof is 3.

The second structure of the third determining module 6 is described below with reference to FIG. 3. Referring to FIG. 3, it is shown the second detailed structural view of the device for detecting proxy at the gateway in FIG. 2. The structure depicted in FIG. 3 is the same as FIG. 2, except that a detailed second interior structure of the third determining module 6 is shown. The second structure of the third determining module includes:

A storage unit 611 is used for caching the cookie information of each IP address, the cookie information being the cookie information with the time stamp. A pre-established list can be stored in the storage unit 611. The list can be a hash table or link list. The cookie information is cached for every IP address that needs to be proxy-monitored in the established hash table or link list.

A cookie time stamp comparing unit 622 is connected with the storage unit 611 and the cookie reading module 5, and used for comparing the time stamp in the cookie information read by the cookie reading module 5 with the time stamp in the corresponding cookie information of the IP address cached before in the list to give a comparing result.

A judgement obtaining unit 633 is used for replacing the corresponding cookie information of the IP address cached before in the list by the read cookie information when the comparing result is that the time stamp in the read cookie information is later than the time stamp in the corresponding cookie information of the IP address cached before in the list, and for obtaining the judgement that the IP address is using proxy when the time stamp in the read cookie information is earlier than the time stamp in the corresponding cookie information of the IP address cached before in the list. In other words, when one PC is accessing the gateway-specified address through a certain IP address, the IP address is using proxy if the cookie information carried in the 'get' request is earlier than the corresponding cookie information of the IP address cached in the list.

The method and device for detecting proxy at the gateway in the embodiments according to the present invention are applied in the gateway server. Implementing the embodiments according to the present invention, firstly determining whether the access request from a certain IP address need to be proxy-monitored or not to obtain a first determining result. Then decomposing said access request into an access request to original address and an access request to gateway-specified address to access the original address and the gateway-specified address separately when the first determining result is yes. Then determining whether a specific cookie information is included in said access request to gateway-specified address or not to obtain a second determining result, said specific cookie information being the cookie information with the time stamp embedded into the client PC by the gateway when responding to said access request to gateway-specified address. Then responding to the access request to gateway-specified address and embedding the cookie information with the time stamp into the client PC by the gateway when said second determining result is no, or reading said cookie information when said second determining result is yes. Finally, determining whether said IP address is using proxy or not on the basis of said cookie information. It can be detected accurately and secretly in the intranet whether a certain IP address is using common proxy or nat proxy.

The preferred embodiments according to the present invention are disclosed above, and the scope of the claims in the present invention will not be restricted to them. The equivalent modifications and/or replacements according to the claims in the present are still within the scope of the present invention.

The ordinary skilled in the art should understand clearly that the present invention can be implemented with the aid of software and necessary hardware in view of the above description of the embodiments, or only through hardware certainly. Base on this consideration, the technical solutions contributing to the prior art can be entirely or partially in the form of software products. The computer software products can be stored in the storage media, such as ROM/RAM, disk, CD, and include commands for enabling a computer device (e.g., PC, server or network device or the like) execute the methods in each embodiment or part thereof according to the present invention.

What is claimed is:

1. A method for detecting a proxy at a gateway comprising:
   determining whether an access request from a certain IP address needs to be proxy-monitored or not to obtain a first determining result;
   decomposing said access request into an access request to an original address and an access request to a gateway-specified address, and to access the original address and the gateway-specified address separately when the first determining result is yes;
   determining whether a specific cookie information is included in said access request to the gateway-specified address or not to obtain a second determining result, said specific cookie information being a cookie information with a time stamp embedded into a client PC by the gateway when the gateway responds to said access request to the gateway-specified address;
   responding to the access request to the gateway-specified address and embedding the cookie information with the time stamp into the client PC by the gateway when said second determining result is no, wherein, one cookie information being used to identify one PC;
   reading said cookie information when said second determining result is yes;
   determining whether said IP address is using a proxy or not on the basis of said cookie information;
   wherein said determining whether said IP address is using the proxy or not on the basis of said cookie information further comprises:
   pre-establishing a list to cache the cookie information and cookie count of each IP address;
   clearing all the cookie information of the corresponding IP address cached in said list and assigning 0 to said cookie count, and responding to the access request to the gateway-specified address and further embedding the cookie information into the client PC, when said second determining result is no;
   reading said cookie information when said second determining result is yes, and inserting this cookie information into the corresponding cookie information list of corresponding IP addresses and adding said cookie count by 1 when said cookie information doesn't exist in the cache;
   determining whether the corresponding cookie count of said certain IP addresses is more than or equal to 2 or not, and obtaining a judgement that said IP address is using the proxy if the corresponding cookie count of said certain IP address is more than or equal to 2.

2. The method according to claim 1, wherein further comprises the following step before determining whether the access request from a certain IP address needs to be monitored or not:
   setting all the IP addresses that need to be proxy-monitored.

3. The method according to claim 1, wherein the time stamp in the cookie information with the time stamp is determined by the current time of the gateway system when being embedded into the client PC.

4. The method according to claim 1, further comprising:
   determining that there are the corresponding cookie count of hosts of client PCs using the same IP address and the number of hosts of the client PCs accessing the Internet with the IP address through proxy is the corresponding cookie count minus one if the cookie count of one IP address has always been the corresponding cookie count.

5. A device for detecting a proxy at a gateway comprising:
a memory for storing a plurality of instructions being executed to detect a proxy at a gateway; and
a processor electrically connected to the memory and executing the instructions to implement steps:
determining whether an access request from a certain IP address needs to be proxy-monitored or not to obtain a first determining result;
decomposing said access request into an access request to an original address and an access request to a gateway-specified address to access the original address and the gateway-specified address separately when the first determining result is yes;
determining whether a specific cookie information is included in said access request to the gateway-specified address or not to obtain a second determining result, said specific cookie information being the cookie information with a time stamp embedded into a client PC by the gateway when responding to said access request to the gateway-specified address;
responding to the access request to the gateway-specified address and embedding the cookie information with the time stamp into the client PC by the gateway when said second determining result is no, wherein, one cookie being used to identify one PC;
reading said cookie information when said second determining result is yes;
determining whether said IP address is using a proxy or not on the basis of said cookie information;
wherein the step of determining whether said IP address is using a proxy or not on the basis of said cookie information comprises:
caching the cookie information of each IP address, said cookie information being the cookie information with the time stamp;
comparing the time stamp in the cookie information read by the cookie reading module with the time stamp in the corresponding cookie information of the IP address cached before in said list to give a comparing result;
replacing the corresponding cookie information of the IP address cached before in said list by the read cookie information when said comparing result is that the time stamp in the read cookie information is later than the time stamp in the corresponding cookie information of the IP address cached before in said list, and for obtaining a judgement that the IP address is using the proxy when the time stamp in the read cookie information is earlier than the time stamp in the corresponding cookie information of the IP address cached before in said list.

6. The device according to claim 5, wherein further comprises:
pre-setting all the IP addresses that need to be proxy-monitored.

7. A gateway server, wherein said gateway server comprises the device for detecting a proxy at the gateway according to claim 5.

8. The device according to claim 5, wherein the time stamp in the cookie information with the time stamp is determined by the current time of the gateway system when being embedded into the client PC.

9. The gateway according to claim 7, wherein the time stamp in the cookie information with the time stamp is determined by the current time of the gateway system when being embedded into the client PC.

* * * * *